March 23, 1937.  C. R. ROGERS  2,074,672

OIL SEAL

Original Filed Jan. 14, 1935

Inventor
Clifford R. Rogers
By
Atty.

Patented Mar. 23, 1937

2,074,672

UNITED STATES PATENT OFFICE 2,074,672

OIL SEAL

Clifford R. Rogers, Oak Park, Ill., assignor to International Harvester Company, a corporation of New Jersey Application January 14, 1935, Serial No. 1,599
Renewed June 11, 1936

13 Claims. (Cl. 288—1)

This invention relates to an oil seal. More specifically it relates to a unit type of oil seal particularly adapted for sealing rotating shafts and the like.

In order to prevent the escape of oil from lubricated parts and to prevent the entrance of dirt into the bearings of mechanisms or into the housings containing mechanisms, oil seals have been developed, which are customarily used. In order to facilitate the installation and replacement of oil seals, they are commonly made in so-called unit form, being embodied in a casing which may be readily removed and replaced.

The object of the present invention is to provide an improved form of oil seal of the unit type. Another object has been to incorporate an elastic, rubber-like material, such as artificial or synthetic rubber, now marketed under the trademark "Duprene", which is not susceptible to being acted upon by oil or grease. This material has been made use of to design a novel oil seal having the desired characteristics to provide a long wearing life and a satisfactory seal.

Figure 1:
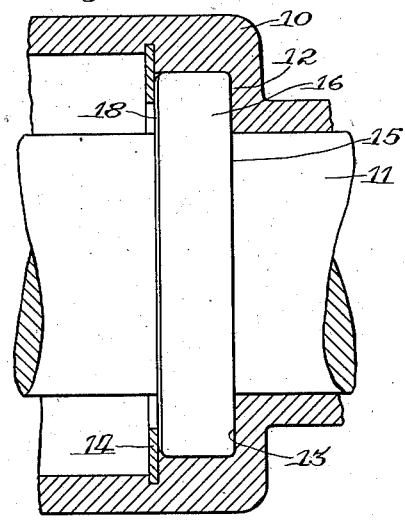
Figure 1 is a sectional view showing a portion of a housing with a shaft extending therethrough and an oil seal in position around the shaft.

As shown in Figure 1, a portion 10 of a housing is illustrated with a portion of a shaft 11 extending therethrough. These elements are shown only diagrammatically as illustrating the position in which a unit oil seal assembly 12 may be mounted in an annular recess 13 in the housing surrounding the shaft. An expansible washer 14 has been illustrated as a means for removably holding the oil seal unit in position. It may be readily removed for inspection or renewal by removing the washer 14.

Figure 2:
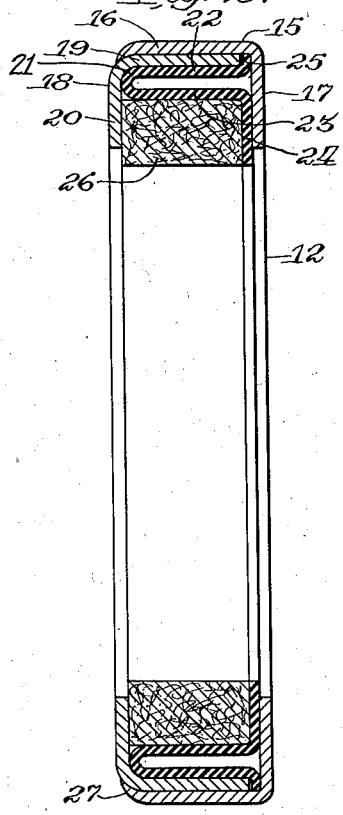
Figure 2 is a sectional view on a plane passing through the axis of a seal embodying the invention; and, Figures 3, 4, 5 and 6 are sectional views showing modifications of the seal shown in Figure 2.

As illustrated in Figure 2, the oil seal unit consists of a casing consisting of an outer casing member 15 having a cylindrical wall 16 and an inwardly and radially extending flange 17. The casing also includes a casing member 18 consisting of a cylindrical wall 19 closely fitted within the wall 16, and a radially and inwardly extending flange 20. The two flanges 17 and 20 lie in parallel planes, as illustrated.

Within the casing, a sealing member 21 is mounted. Said member consists of an outer cylindrical wall 22 lying closely adjacent to the cylindrical wall 19 of the inner casing member and a spaced cylindrical wall 23 provided with a radial flange 24 lying in contact with the inside of the flange 17. At the end opposite the flange 24, the wall 23 is integrally connected with the wall 22. Said outer wall is provided with a short outwardly and radially extending flange 25, which is fitted between the flange 17 and the edge of the wall 19 of the inner casing member.

The sealing member 21 is constructed of an oil resistant, rubber-like material, which has substantially the same properties as rubber, yet is not affected in use by the action of oil or grease. Said material may be molded into the shape shown in Figure 2 and has in that shape the desired resiliency to hold the sealing element 26 resiliently in contact with a shaft. The sealing element 26, as illustrated, consists of an annular piece of felt-like material, which is capable of absorbing and holding oil, and which forms a satisfactory long wearing contact with a moving shaft. Said element is substantially rectangular in cross section, one edge abutting the inside of the flange 24 of a sealing member and the other edge abutting the inside of the flange 20 of the inner casing member. The outer wall of the sealing element abuts the inside of the cylindrical wall 23 of the sealing member, and the inner wall is adapted to contact with a rotating or reciprocating element.

In the assembly of a sealing unit, as shown in Figure 2, the flange 25 is securely held in position by compressing the two casing members together, while the edge 27 of the outer casing member is rolled or formed permanently into position. It will be understood that these complete assemblies are not taken apart for renewal of the elements thereof, the complete unit being replaced when worn or damaged to the extent that its use is unsatisfactory.

Figure 3:
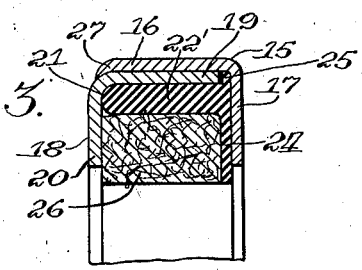

The modification shown in Figure 3 is substantially the same as that shown in Figure 2 and bears the same reference characters with the exception of the wall structure of the sealing member 21. Said member is made with only one cylindrical wall 22', there being sufficient inherent resiliency in the material to provide sufficient elasticity and radial compression against the sealing element 26.

Figure 4:
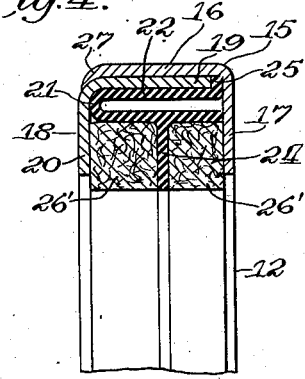

The modification shown in Figure 4 is similar to the construction shown in Figure 2 and bears the same reference characters, with the exception that a radial flange 24' extends from the cylindrical wall 20 at a central portion thereof.

This construction provides two sealing element compartments in which the seals 26' are positioned, one of the sealing elements abutting the radial flange 20 of the inner casing and the central flange 24' of the sealing member. The other sealing element 26' abuts the flange 24' and the radial flange 17 of the outer casing member 15.

Figure 5:
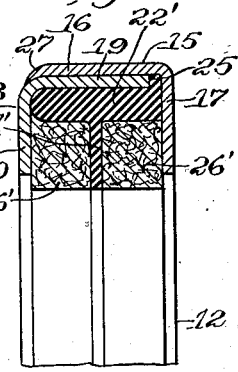

The modification shown in Figure 5 is substantially the same as the form shown in Figure 3, being different in that the radial flange 24' of the sealing member is centrally located as in the form shown in Figure 4, whereby two compartments are formed for the sealing elements 26'.

Figure 6:
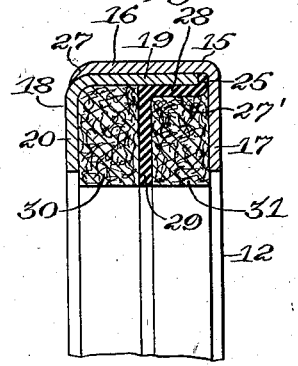

The modification shown in Figure 6 is formed with a casing, as in the other modifications, and bears the same reference characters. The sealing member and sealing elements are somewhat different in form. The sealing member 27' is formed with a cylindrical wall 28 extending only approximately half way across the inner wall 19 of the casing member 18, which it abuts. The cylindrical wall 28 is provided with an outwardly extending flange 25, which is secured in the same manner between the casing members as in the other modifications above described.

Approximately midway of the casing, the sealing member 27 is provided with an integral, radially extending flange 29. Said flange divides the interior of the casing into two compartments containing annular sealing elements 30 and 31. The sealing element 30 abuts the flange 20 of the inner casing member and one side of the flange 29 of the sealing member, also the inside of the wall 19 of the inner casing member. The sealing element 31 abuts the flange 17 of the outer casing member and the other side of the flange 29 of the sealing member, also the inner side of the cylindrical wall 28 of the sealing member.

The constructions of all of the modifications illustrated have been described in detail. Their operation will be clearly understandable to those skilled in the art from the description. The use of the oil resistant rubber-like material, which is a new development in synthetic chemistry, has made possible the novel constructions of this invention. The elasticity of this material in the forms illustrated and described provides an effective and simple sealing element at a low cost.

It is to be understood that applicant has shown and described only certain preferred embodiments of his invention and that he claims all modifications falling within the scope of the appended claims.

What is claimed is:

1. An oil seal comprising an outer casing member having a cylindrical wall and a radially and inwardly extending flange, an inner casing member having a cylindrical wall fitted inside the wall of the outer member and a radially and inwardly extending flange substantially parallel to the flange of the other casing member, and a resilient elastic oil resistant sealing member having a cylindrical wall lying adjacent the inside of the cylindrical wall of the inner casing member and being provided with an outwardly extending radial flange secured between the edge of the wall of the inner casing member and inside of the flange of the outer casing member, said sealing member having at its end opposite the connection with the outer wall a radially and inwardly extending flange, and an annular resilient sealing member mounted in abutment with the radial flange of the inner casing member, the flange of the sealing member and the cylindrical wall of the sealing member.

2. An oil seal comprising a casing having a cylindrical wall and spaced radially extending flanges, a resilient and elastic sealing member mounted in the casing, said sealing member having a cylindrical wall in contact with the cylindrical wall of the casing and a central flange radially extending from the cylindrical wall, and sealing elements positioned between said flange of the sealing member and the flanges of the casing.

3. An oil seal comprising a casing having a cylindrical wall and spaced radial flanges, a resilient elastic oil resistant sealing member having spaced cylindrical inner and outer walls connected at one end, one of said walls lying adjacent the inside of the cylindrical casing wall, the other wall of the sealing member being provided intermediate its ends with a radially and inwardly extending flange, and resilient sealing elements mounted in abutment with said flange and the wall of the sealing member connected thereto and with the radial flanges of the casing.

4. An oil seal comprising an outer casing member having a cylindrical wall and a radially and inwardly extending flange, an inner casing member having a cylindrical wall fitted inside the wall of the outer member and a radially and inwardly extending flange substantially parallel to the flange of the outer casing member, a resilient elastic oil resistant sealing member having spaced inner and outer cylindrical walls integrally connected at one end, one of said walls lying adjacent the inside of the cylindrical wall of the inner casing member and being provided with an outwardly extending radial flange secured between the edge of the wall of the inner casing member and inside of the flange of the outer casing member, the other wall of said sealing member being provided at its end opposite the connection with the outer wall with a radially and inwardly extending flange lying in contact with the inside of the flange of the outer casing member, and an annular resilient sealing member mounted in abutment with the radial flange of the inner casing member, the flange of the sealing member and the inner cylindrical wall of the sealing member.

5. An oil seal comprising an outer casing member having a cylindrical wall and a radially and inwardly extending flange, an inner casing member having a cylindrical wall fitted inside the wall of the outer member and a radially and inwardly extending flange substantially parallel to the flange of the outer casing member, a resilient elastic oil resistant sealing member having spaced inner and outer cylindrical walls integrally connected at one end, one of said walls lying adjacent the inside of the cylindrical wall of the inner casing member and being provided with an outwardly extending radial flange secured between the edge of the wall of the inner casing member and inside of the flange of the outer casing member, the other wall of said sealing member being provided intermediate its ends with a radially and inwardly extending flange, and annular resilient sealing members mounted in abutment with the radial flanges of the casing members, the flange of the sealing member and the inner cylindrical wall of the sealing member.

6. An oil seal comprising an outer casing member having a cylindrical wall and a radially and inwardly extending flange, an inner casing member having a cylindrical wall fitted inside the wall of the outer member and a radially and inwardly extending flange substantially parallel to the flange of the other casing member, and a resilient elastic oil resistant sealing member having a cylindrical wall lying adjacent the inside of the cylindrical wall of the inner casing member and being provided with an outwardly extending radial flange secured between the edge of the wall of the inner casing member and inside of the flange of the outer casing member, said sealing member having a radially and inwardly extending flange and an annular resilient sealing member mounted in abutment with the radial flange of one of the casing members, the flange of the sealing member and the cylindrical wall of the sealing member.

7. An oil seal comprising an outer casing member having a cylindrical wall and a radially and inwardly extending flange, an inner casing member having a cylindrical wall fitted inside the wall of the outer member and a radially and inwardly extending flange substantially parallel to the flange of the outer casing member, a resilient elastic oil resistant sealing member having spaced inner and outer cylindrical walls integrally connected at one end, one of said walls lying adjacent the inside of the cylindrical wall of the inner casing member, the other wall of said sealing member being provided intermediate its ends with a radially and inwardly extending flange, and annular resilient sealing members mounted in abutment with the radial flanges of the casing members, the flange of the sealing member and the inner cylindrical wall of the sealing member.

8. A sealing device comprising a casing formed in part by a member having a substantially cylindrical wall and an inwardly and radially disposed wall and in part by a member abutting said first named member, said last named member having a radially disposed wall spaced from the radially disposed wall of said first named member, a resilient elastic oil resistant sealing member provided with an outwardly extending flange secured between the two casing members and a radially and inwardly extending flange, and an annular resilient sealing member mounted in abutment with one wall of the casing and with the inwardly extending flange of the sealing member.

9. A sealing device comprising a casing formed in part by a member having a substantially cylindrical wall and an inwardly and radially disposed wall and in part by a member telescopically received by said first named member, said last named member having a radially disposed wall spaced from the radially disposed wall of said first named member, a resilient elastic oil resistant sealing member provided with an outwardly extending flange secured between the two casing members and a radially and inwardly extending flange, and an annular resilient sealing member mounted in abutment with one wall of the casing and with the inwardly extending flange of the sealing member.

10. A sealing device for shafts and the like comprising a casing, two annular sealing elements constructed of an oil absorbent material mounted in said casing, and an elastic sealing member constructed of an oil impervious material positioned between the sealing elements, said member extending into contact with the casing and being secured thereto around its periphery in a fluid tight manner.

11. A sealing device comprising a casing having a cylindrical wall and spaced radially extending flanges, said casing being formed to provide a recess, an elastic oil impervious sealing element mounted in said casing, said sealing element having a cylindrical wall lying adjacent the cylindrical wall of said casing and being provided with an outwardly extending flange disposed in said recess and an inwardly extending portion adapted to form a liquid barrier, means for securing said flange in said recess, and a sealing member disposed between said inwardly extending portion and one of the flanges of the casing.

12. A sealing device comprising a casing having a cylindrical wall and spaced radially extending flanges, said casing being formed to provide a recess, an elastic oil impervious sealing element mounted in said casing, said sealing element having a cylindrical wall lying adjacent the cylindrical wall of said casing and being provided with an outwardly extending flange disposed in said recess and an inwardly extending flange, means for securing said flange in said recess, and a sealing member in abutment with one of the radially extending flanges of said casing, the flange of said sealing element, and the cylindrical wall of the sealing element.

13. A sealing device comprising a casing having a cylindrical wall and spaced radially extending flanges, said casing being formed to provide a recess, a resilient oil impervious sealing element mounted in said casing, said sealing element having a cylindrical wall lying adjacent the cylindrical wall of said casing and being provided with an outwardly extending flange disposed in said recess and an inwardly extending flange, means for securing said flange in said recess, and a sealing member disposed on each side of said inwardly extending flange.

CLIFFORD R. ROGERS.